May 28, 1957 A. BOUWERS ET AL 2,793,564
OPTICAL IMAGE FORMING LENS AND MIRROR SYSTEM COMPRISING
A SPHERICAL MIRROR AND TWO MENISCUS CORRECTOR LENSES
Filed April 6, 1953

INVENTORS
A. Bouwers
BY J. Becker
Wenderoth, Lind & Ponack
Attorneys

United States Patent Office 2,793,564
Patented May 28, 1957

2,793,564

OPTICAL IMAGE FORMING LENS AND MIRROR SYSTEM COMPRISING A SPHERICAL MIRROR AND TWO MENISCUS CORRECTOR LENSES

Albert Bouwers, The Hague, and Johannes Becker, Delft, Netherlands, assignors to N. V. Optische Industrie "De Oude Delft," Delft, Netherlands Application April 6, 1953, Serial No. 346,927

Claims priority, application Netherlands April 29, 1952

3 Claims. (Cl. 88—57)

Optical mirror systems comprising a concave spherical mirror and a meniscus-shaped lens are known. Reference is made e. g. to applicant's U. S. Letters Patent No. 2,492,461.

When endeavors are made to obtain an even greater resolving power whilst maintaining the luminosity, it appears that the application of thick meniscus-lenses is greatly desirable in order to be able to correct the spherical aberration. Such a thick meniscus-lens however, gives rise to the difficulty that there is no longer enough space for the image plane, which would lie on or within the meniscus lens, when the system is corrected to an optimal extent.

This difficulty is met according to the invention by making the corrector of two meniscus-lenses placed between the centre of curvature of the mirror and the mirror, and curved in the same sense as this mirror, whilst the image plane is located between the two meniscus-lenses. Thus the advantage is obtained that an optimal correction can indeed be achieved, whilst the image plane remains well accessible.

When the optical system is used for photography or projection and a film is applied, the meniscus lens which is located closest to the mirror will, according to the invention, be preferably provided with an oblong slot, through which the film can be led.

The meniscus-lens located closest to the concave mirror can be either provided with a central aperture or not. If not, then it follows that this meniscus-lens is traversed twice by the rays of light. In that case advantage can be taken of the second passage for a further improvement of the correction.

In a particularly advantageous embodiment of the system according to the invention, at least one of the meniscus-lenses is executed as a doublet. In that way a very good chromatic correction is obtained. In the accompanying Figures 1, 2 and 3 two embodiments of the optical system according to the invention are shown by way of example.

Figure 2:
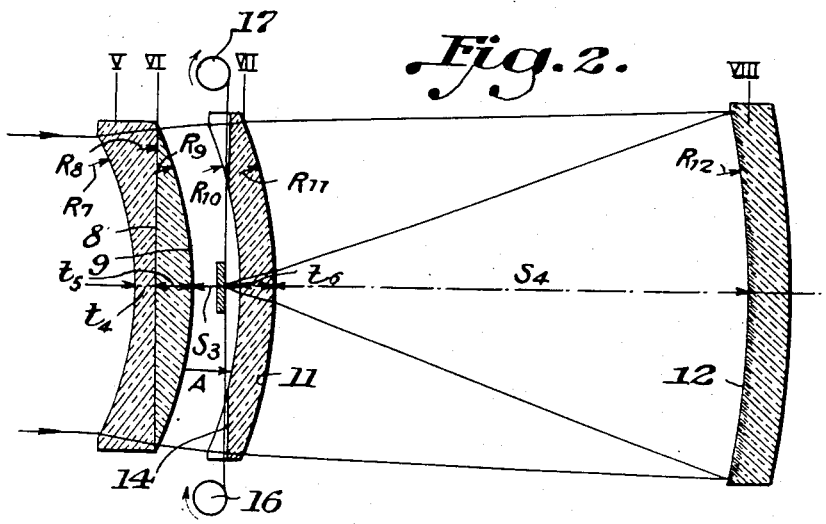
Fig. 2 represents a cross section of a second example, which is to be used with film.
Figure 3:
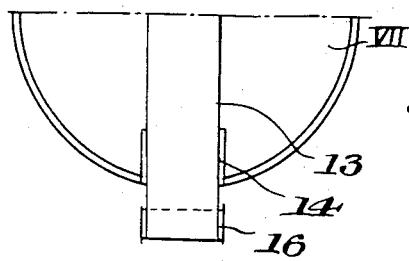

Fig. 3 gives a view of part of the system in Fig. 2.

Figure 1:
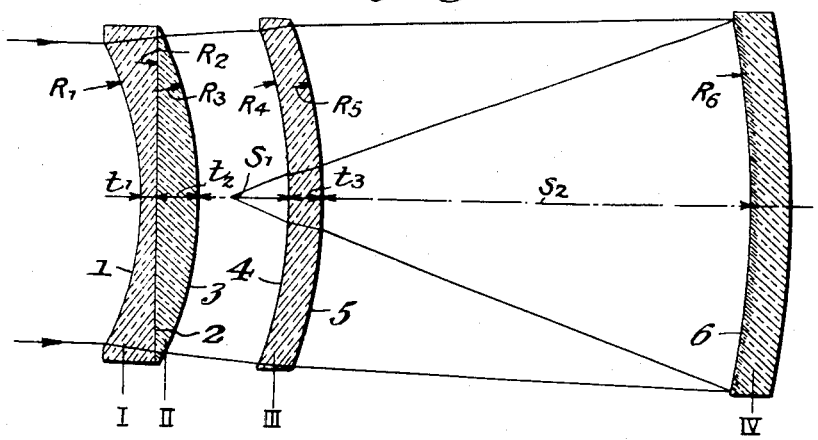
Fig. 1 is a cross-section of a first embodiment.

The optical system represented in section in Fig. 1 consists of a corrector built up of the three lens components I, II and III. Components I and II together form a meniscus-shaped doublet, whilst III is a single meniscus-lens. Furthermore the system comprises the concave spherical mirror IV.

A parallel incident ray of light is focused by the system in F.

The constructional data are compiled in the table below:

| Surface No. | Radius of curvature in mm. | Lens | Axial thickness, axial separations in mm. | $n_D$ | ν |
|---|---|---|---|---|---|
| 1 | $R_1 = -79.16$ | I | $t_1 = 3.84$ | 1.517 | 64.4 |
| 2 | $R_2 = \infty$ | | | | |
| 3 | $R_3 = +93.00$ | II | $t_2 = 10.00$ | 1.517 | 56.8 |
| 4 | $R_4 = -114.42$ | | $S_1 = 21.42$ | | |
| 5 | $R_5 = +121.85$ | III | $t_3 = 7.43$ | 1.517 | 64.4 |
| 6 | $R_6 = -223.10$ | | $S_2 = 101.25$ | | |

In this table $n_D$ represents the refractive index for sodium light and ν the dispersion number of Abbe.

Focus F is situated between lenses II and III, viz. at a distance of 7.3 mm. from surface 3 and 14.1 mm. from surface 4.

The equivalent focal length amounts to 100 mm. and the relative aperture to 1:1.4.

The resolving power of this system is very great on account of the application of two meniscus-lenses. Even for a great focal length (300 mm.) and for photography of objects of low contrast (log contrast=0.2) the resolving power amounts to 50 lines per mm.

In Fig. 2 a second embodiment is represented. It is built in the same way as the first example and consists of lenses V, VI and VII, and the concave spherical mirror VIII. The optically active surfaces are indicated by 7, 8, 9, 10, 11 and 12 respectively.

Furthermore, in Fig. 2 film 13 is indicated, which film is led through slot 14. The form of the slot can be seen from Fig. 3, in which is drawn a view of meniscus-lens VII along arrow A.

An image support 15 is provided in F, which is slightly curved on account of the image curvature of the optical system. The usual means to press the film against the support 15 are not represented for the sake of clearness.

Finally, take-up spool 16 and feed spool 17 are schematically shown.

We claim:

1. Optical image forming lens and mirror system comprising a spherical concave mirror and a meniscus lens corrector in axial alignment therewith, said corrector member comprising two meniscus-lenses placed between the centre of curvature of said mirror and said mirror and curved in the same sense as said mirror, and said meniscus-lenses being so spaced from one another that the image plane is located between said two meniscus-lenses.

2. Optical system according to claim 1 for photography or projection, wherein the meniscus-lens located closest to said mirror is provided with a transverse oblong slot in one inner meniscus lens surface through which film may be led.

3. Optical system according to claim 1, wherein the meniscus-lens which is located closest to said spherical concave mirror is traversed twice by the optically active rays.

(References on following page)

References Cited in the file of this patent

UNITED STATES PATENTS

| | | |
|---|---|---|
| 2,336,379 | Warmisham | Dec. 7, 1943 |
| 2,420,349 | Bouwers | May 13, 1947 |
| 2,492,461 | Bouwers | Dec. 27, 1949 |
| 2,504,383 | Bouwers et al. | Apr. 18, 1950 |
| 2,515,873 | Helm | July 18, 1950 |
| 2,551,852 | Rinia | May 8, 1951 |
| 2,593,189 | Rinia et al. | Apr. 15, 1952 |

FOREIGN PATENTS

| | | |
|---|---|---|
| 544,694 | Great Britain | Apr. 23, 1942 |
| 824,558 | Germany | Dec. 13, 1951 |
| 1,007,271 | France | Feb. 6, 1952 |

OTHER REFERENCES

Maksutov: "New catadioptric meniscus system," in Journal Optical Society of America, vol. 34, No. 5, 1944, pages 270–284.